US012773947B2

(12) United States Patent
Crino

(10) Patent No.: US 12,773,947 B2
(45) Date of Patent: Oct. 27, 2026

(54) PROXIMITY DETECTION AND ALERT SYSTEMS AND METHODS

(71) Applicant: ENGAGE ENTERPRISES LLC, Beaverton, OR (US)

(72) Inventor: Matthew Crino, Beaverton, OR (US)

(73) Assignee: ENGAGE ENTERPRISES LLC, Beaverton, OR (US)

( * ) Notice: Subject to any disclaimer, the term of this patent is extended or adjusted under 35 U.S.C. 154(b) by 202 days.

(21) Appl. No.: 18/751,142

(22) Filed: Jun. 21, 2024

(65) Prior Publication Data

US 2024/0424987 A1 Dec. 26, 2024

Related U.S. Application Data

(60) Provisional application No. 63/509,947, filed on Jun. 23, 2023.

(51) Int. Cl.
*G06F 17/10* (2006.01)
*B60Q 9/00* (2006.01)
*G01S 11/06* (2006.01)

(52) U.S. Cl.
CPC .............. *B60Q 9/008* (2013.01); *G01S 11/06* (2013.01)

(58) Field of Classification Search
CPC ................................ B60Q 9/008; G01S 11/06
See application file for complete search history.

(56) References Cited

U.S. PATENT DOCUMENTS

2012/0190325 A1* 7/2012 Abu-Hakima ...... H04L 12/1895 455/404.2
2017/0230795 A1* 8/2017 Rentz .................. G06Q 10/047
2020/0057453 A1* 2/2020 Laws ....................... G08G 1/22
2023/0341541 A1* 10/2023 Barratt .................. H04B 1/005

* cited by examiner

*Primary Examiner* — Adam M Alharbi
(74) *Attorney, Agent, or Firm* — Dorsey & Whitney LLP

(57) ABSTRACT

Systems and methods for generating alerts based on device proximity are disclosed. Presence of a second device is detected by a first device. The presence can be detected based on a signal received directly from the second device. A distance between the first device and the second device is determined. The distance can be based on a strength of the signal from the second device. An alert is generated based on comparing the determined distance to a threshold distance. The systems and methods can be used to determine proximity between devices worn or carried by respective users. The systems and methods can be used to reduce the likelihood of collisions between vehicles, such as off-road vehicles.

19 Claims, 3 Drawing Sheets

PROXIMITY DETECTION AND ALERT SYSTEMS AND METHODS

CROSS REFERENCE TO RELATED APPLICATION(S)

This application claims the benefit under 35 U.S.C. § 119 of the earlier filing date of U.S. Provisional Application Ser. No. 63/509,947, filed Jun. 23, 2023, the entire contents of which are hereby incorporated by reference in its entirety for any purpose.

TECHNICAL FIELD

This application relates to systems and methods for detecting proximity of devices and/or objects and generating alerts. More specifically, this application relates to reducing the likelihood of collisions between objects, such as vehicles, by generating alerts based on detecting presence and/or proximity of the objects.

BACKGROUND

An off-road vehicle can be any vehicle capable of driving off paved and/or gravel surfaces, such as a vehicle capable of traveling on trails or forest roads that have rough and/or low-traction surfaces. Examples of off-road vehicles include all-terrain vehicles, dirt bikes, or the like. Off-road vehicles may operate in remote environments, such as areas that may lack public utilities and/or areas that may lack access to common wireless communication technologies (e.g., areas where no telecommunications base stations are in range). Further, many people enjoy outdoor activities, such as hiking, camping, mountain biking, and the like, in areas that may not include cellular services or internet services. In such environments, communication between different people or different groups can be difficult or impossible, resulting in possible collisions (e.g., via dirt bikes or ATVs) or delays in getting help or medical attention. As such, there is a need for systems and methods that can improve or enable communication in remote or similar areas.

SUMMARY

Apparatuses, systems, and methods for determining proximity of devices or objects and generating alerts are disclosed. For example, the disclosed technology can include one or more hardware devices worn or carried by a user in a remote environment, such as on an off-road vehicle or carried on the off-road vehicle. The one or more hardware devices can include one or more sensors to detect presence and/or proximity of a different one of the hardware devices to indicate presence and/or proximity of the different one of the hardware devices. The proximity can indicate, for example, that another user of another off-road vehicle is within a threshold distance, which can indicate an increased likelihood of a collision. Based on the detected proximity, the one or more hardware devices can generate an alert, such as a signal transmitted to another device (e.g., a fob, a smartphone, a connected device) to alert the user of the proximity of the different one of the hardware devices, such as to warn the user to slow down, change direction, or take other actions to reduce the likelihood of a collision. In some implementations, the alert is provided via the same device that detects the proximity.

In accordance with at least one example disclosed herein, a method of generating a proximity-based alert in a remote environment is disclosed. Presence of a second device is detected at a first device based on a signal received directly from the second device. The first device can be, for example, a wearable device. A distance is determined, at the first device, between the first device and the second device based at least in part on a strength of the received signal. An alert is generated based on comparing the determined distance to a threshold distance. In various embodiments, the first device and the second device do not communicate via a cellular network.

In various embodiments, the first device is part of a first group of devices and the second device is part of a second group of devices, separate from the first group. In these and other embodiments, the first device is associated with a first user, and the second device is associated with a second user. For example, the first user may be an operator of a first off-road vehicle and the second user may be an operator of a second off-road vehicle. Additionally or alternatively, the first group of devices is associated with a first group of users and the second group of devices is associated with a second group of users. In various embodiments, the first device is configured as a lead device of the first group of devices, and the first device provides the alert to other devices in the first group of devices. For example, the first device can be configured as the lead device using a quick response (QR) code associated with the first device.

In various embodiments, the method includes determining one or more of a speed, an acceleration, or a direction of the first device or the second device, and generating the alert is further based on the speed, the acceleration, or the direction.

In various embodiments, generating the alert includes causing at least one of a tactile alert, an audio alert, or a visual alert. In various embodiments, the tactile alert, the audio alert, and/or the visual alert is performed at a secondary device coupled to the first device.

In various embodiments, the method includes determining a user class or type associated with the second device, and generating the alert is further based on the user class or type.

In accordance with at least one example disclosed herein, a notification device is disclosed comprising a transceiver, a processor, and a memory. The memory carries instructions configured to cause the notification device to detect presence of an unrelated device based on a signal received from the unrelated device via the transceiver. The notification device may be part of a first group of devices that is separate and unrelated to a second group of devices, and the unrelated device may be part of the second group of devices. Additionally, the instructions cause the notification device to estimate a distance between the notification device and the unrelated device based at least in part on a strength of the signal. And the instructions cause the notification device to generate an alert based on comparing the estimated distance to a threshold distance.

In various embodiments, estimating the distance is further based on geolocation data (e.g., global positioning system (GPS) data) of the notification device, geolocation data of the unrelated device, or both.

In various embodiments the notification device further includes a display configured to provide a visual component of the alert via a graphical user interface, a speaker configured to provide an auditory component of the alert, and/or an electric motor configured to provide a tactile component of the alert.

In various embodiments, the instructions further cause the notification device to establish a connection with the unrelated device via a wireless mesh network (WMN) or a wireless mobile ad hoc network (MANET) to receive the signal.

In various embodiments, the instructions cause the notification device to determine a user class or type associated with the unrelated device, and generating the alert is further based on the user class or type. In these and other embodiments, the instructions cause the notification device to determine at least one of a speed, an acceleration, or a direction associated with the unrelated device, and generating the alert is further based on the speed, the acceleration, or the direction.

In various embodiments, the notification device includes at least one sensor configured to capture sensor data associated with the notification device, and the instructions further cause the notification device to transmit the captured sensor data to the unrelated device via the transceiver.

In accordance with at least one example disclosed herein, a method for detecting devices in a remote environment without cellular coverage is disclosed. A first signal is received from a first device via a non-cellular network and through a direct transmission. A first distance of the first device is determined based on the first signal. An alert is generated at a second device when the first distance is under a threshold.

In accordance with at least one example disclosed herein, systems are disclosed configured to perform operations of one or more of the foregoing embodiments. For example, disclosed systems may comprise one or more devices disclosed herein and/or one or more processors, memories, transceivers, antennae, input/output (I/O) components, or sensors, and so forth. Additionally or alternatively, other methods are disclosed comprising one or more operations according to one or more of the foregoing embodiments. Additionally or alternatively, one or more non-transitory computer-readable media are disclosed carrying instructions configured to cause performance of one or more operations of the foregoing embodiments.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely illustrative in nature and is in no way intended to limit the claims or their applications or uses. It is to be understood that structural and/or logical changes may be made without departing from the spirit and scope of the present disclosure.

The present disclosure is set forth in various levels of detail, and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, and the scope of the present disclosure is defined only by the appended claims.

BRIEF DESCRIPTION OF THE DRAWINGS

The description will be more fully understood with reference to the following figures. The figures should not be construed as a complete depiction of the scope of the claimed features.

Figure 1:
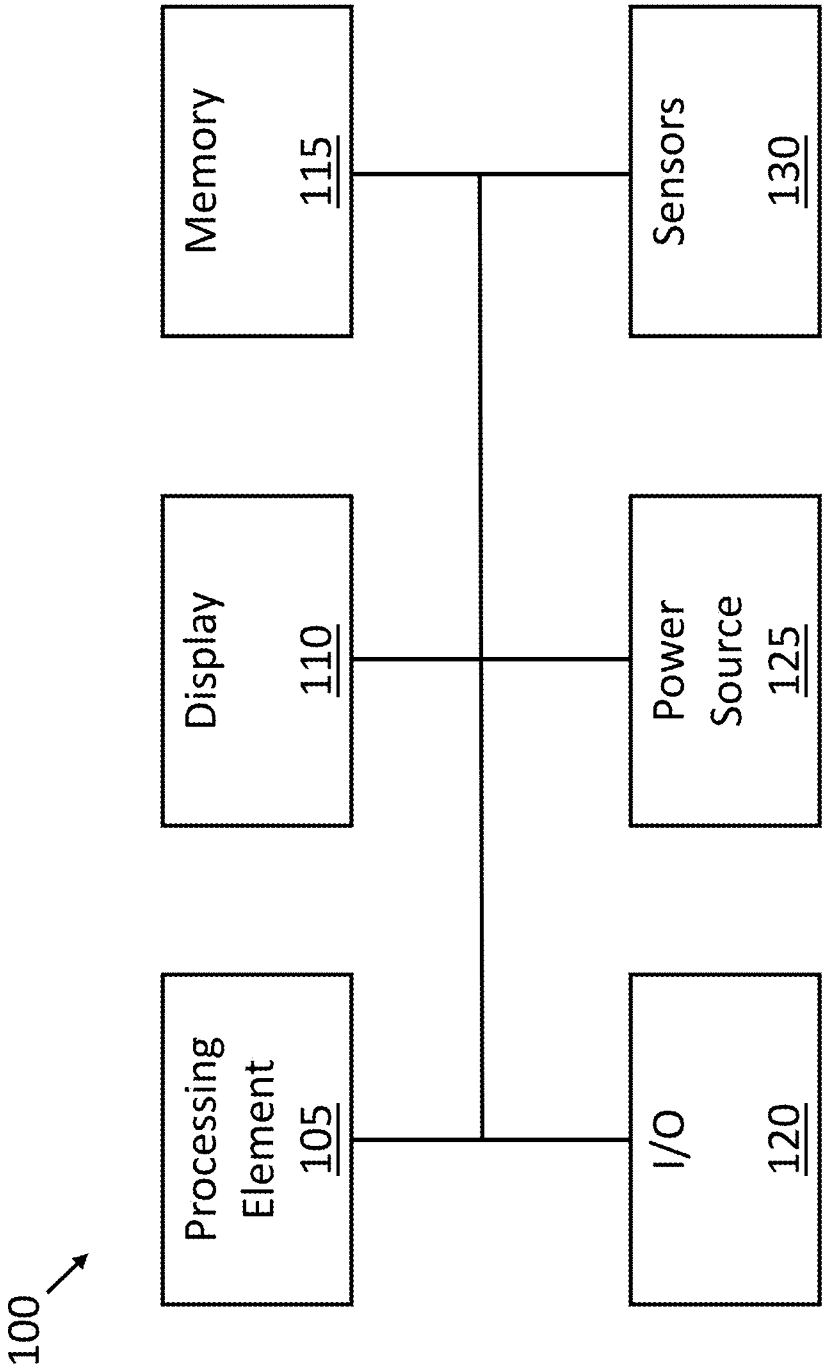
FIG. 1 is a block diagram illustrating a device according to one or more embodiments.

Embodiments of this disclosure and their advantages are best understood by referring to the detailed description that follows.

DETAILED DESCRIPTION

The following description of certain examples is merely illustrative in nature and is in no way intended to limit the invention or its applications or uses. In the following detailed description of examples of the present apparatuses, systems, and methods, reference is made to the accompanying drawings which form a part hereof, and in which are shown by way of illustration specific examples in which the described apparatuses, systems, and methods may be practiced. These examples are described in sufficient detail to enable those skilled in the art to practice the presently disclosed apparatuses, systems, and methods, and it is to be understood that other examples may be utilized and that structural and logical changes may be made without departing from the spirit and scope of the present disclosure. Moreover, for the purpose of clarity, detailed descriptions of certain features will not be discussed when they would be apparent to those with skill in the art so as not to obscure the description of the present system. The following detailed description is therefore not to be taken in a limiting sense, and the scope of the present technology is defined only by the appended claims.

Users of off-road vehicles face difficult technical challenges related to detecting proximity and/or location of other users of off-road vehicles, such as for tracking or locating other users, avoiding collisions, or the like. For example, users may need to navigate narrow roads and/or trails; users may not be in the same party with other users and/or be aware of other users of the same roads and/or trails; users may have limited/restricted visibility to effectively detect each other in close proximity without a line of sight, without looking at a screen, and/or where physical flagging-type attachments are not conducive or applicable due to environmental constraints; users may operate vehicles in areas where it is difficult to access WiFi, cellular service, or other wireless communication technologies; users may operate vehicles in areas where geological and/or other physical characteristics of the area do not allow for easy visibility or communication (e.g., due to rough terrain, changes in altitude, trees or other vegetation).

Accordingly, there is heightened risk for collision between vehicles oftentimes leading to injury, vehicle or other property damage, damage of the natural surrounding area, and so forth. These collisions can also result in difficult remote emergency extractions of the injured and/or the damaged vehicles. Existing technologies fail to address these and other technical challenges. Therefore, there exists a need for technologies to allow users to detect presence and/or proximity of other users, such as to decrease the likelihood of collisions between off-road or other vehicles. Similarly, people hiking, camping, mountain biking, skiing, or otherwise in outdoor and/or remote environments may not be able to communicate with other groups or people due to the lack of cellular or other communication systems. This can cause people to be stranded or otherwise introduce delays in receiving help, identifying locations, or the like.

Disclosed herein are systems and related methods for detecting proximity of one or more devices and/or generating alerts based on detected proximities ("system" or "proximity detection system"), such as unified systems for tracking locations and/or proximities of users of off-road vehicles. For example, the disclosed system can include a device or set of devices worn or carried by a user of an off-road vehicle, which can comprise, for example, a belt, vest, helmet, watch, tablet, or other wearable or portable device. In some implementations, a device can be affixed or carried on a vehicle. The device can use various sensors and/or wireless technologies, such as short-range wireless technologies, including but not limited to the use of radio frequency (RF), global positioning system (GPS), WiFi, electromagnetic, Bluetooth components, or the like. In some implementations, the device or set of devices can operate without the use of cellular signals. The device or set of devices can be worn or carried on a person, wearable, contained/mounted/imbedded on or within protective body worn gear or attached to a vehicle or any sizable object by any means as to not restrict functionality. In many embodiments, the alert devices may not be equipped with components to enable cellular communication (e.g., may not be configured to transmit or receive microwave frequencies and/or with cellular towers of the like). In other embodiments, the devices may include a separate cellular module that may be configured to communicate with cellular equipment when the device is within range of a cellular tower or network, but the cellular communication may be separate from the main signaling/alerting functionality. In most cases the device is operating in an environment that lacks or has poor coverage of cellular networks.

The device or set of devices can be housed in a durable housing that can withstand harsh environments, vibrations, atmospheric pressure changes, and/or other conditions. The device or set of devices are configured to detect the presence and/or proximity of other such devices or sets of devices, such as to detect another nearby user of the system. When detection of another device occurs, the system can generate one or more alerts. In some implementations, generating an alert can include sending a Bluetooth or other wireless alert signal to a secondary device to perform one or more operations responsive to the alert. For example, a main device can detect that another user is nearby based on detecting a device associated with the nearby user, and the main device can send a signal to a second device to generate the alert, such as by causing the second device to vibrate, causing the second device to play an audio alert, causing the second device to display an alert (e.g., a visual alert, a flashing indictor, or the like). In some implementations, no second device is necessary, and the main device provides the alert (e.g., the audio, visual, and/or tactile alert).

In implementations that include a main device and a secondary device, the secondary device can be configured to be worn in an optimal or desirable location to receive a wireless alert communication/signal from the main device to which it is paired. For example, the secondary device can be worn under or inside the user's protective gear, such as under a helmet or on a lanyard close to the skin.

Although various examples are discussed with respect to alerts for distance, the communication systems described herein may allow other types of alerts or notifications to be transmitted across groups of users, including first responders or the like.

In some implementations, the system can include an application or computer program product, which can perform various operations, such as to facilitate the setting up of the user devices. The application allows the set-up of multiple devices within formed device parties, groups, or pods, which reduces the likelihood of false alerts. For example, the application configures the user devices of the pod to generate alerts only when a device from outside or unrelated to the pod is detected within a threshold distance, e.g., to indicate that a user from outside the pod is nearby. In some implementations, one device within a pod can transmit an alert to other devices within the pod, such as a lead device or a first device to detect proximity of a device from outside the pod. In some implementations, the application allows a user to activate and/or deactivate the system entirely at will. In some implementations, the application allows the user to modify user and/or device settings, such as privacy settings related to use of the device. The system can use various technologies to set up devices via the application. For example, devices can be associated with identifiers that are captured by the application, such as using scannable codes (e.g., quick response (QR) codes or barcodes), and the identifiers can be used to set up the devices via the application, such as to associate the devices with respective pods. In some implementations, the application includes other functionality, such as functionality to view usage of an area by scanning a code (e.g., a QR code posted on a sign at an area where the system is used) and/or to generate and transmit reports or other information to a manager of the area.

In some implementations, multiple alerts and/or alert levels can be used. For example, a first alert level can indicate that another device is detected, but the other device is not within a threshold distance that would indicate an increased likelihood of a collision. In some implementations, no alert is generated when the other device is not within the threshold distance. In some implementations, a second alert level can indicate that the other device is within the threshold distance. In some implementations, multiple threshold distances can be used, each threshold distance having a corresponding alert level, such as successively higher alert levels as the second device gets closer. Each alert level can be associated with corresponding operations, such as softer or harder vibrations, louder or quieter audio alerts, flashing lights, and so forth. Other examples of operations associated with alerts can include automatically causing a vehicle to slow down or shut off.

In some implementations, alerts can be generated based on other factors in addition to and/or as an alternative to threshold distances. For example, alerts can be generated based on determinations and/or estimates of speed, acceleration, direction, or the like. In these and other implementations, the disclosed technology can determine or estimate speed, acceleration, direction, or the like of devices, such as to determine that a second device is speeding up in the direction of a first device.

In various embodiments, the system associates users with different classes and/or types, and operations of the system can be modified based on the user classes or types. For example, a priority user class or type can be associated with priority users, such as law enforcement or first-responder users. Alerts associated with priority users may be assigned a higher priority, relative to alerts associated with other users, and alert characteristics may be modified based on being associated with a priority user. For example, an alert associated with a priority user can be communicated to all devices within a predetermined range, and the alert can be of a different type to alert all users within range of the priority user.

Advantageously, such embodiments may allow law enforcement or first-responder users to generate alerts in areas with low visibility. In such embodiments, a priority user class or type may be determined only when an external condition is met, such as when emergency lights or a siren are activated. For example, an emergency vehicle may be equipped with a light bar and a siren, as well as a device of the disclosed system. The device of the disclosed system may activate a priority user status when the light bar or the siren of the emergency vehicle is activated. In these and other embodiments, the device of the disclosed system may be coupled to a switch for activation of the light bar or the siren. Additionally or alternatively, different user classes or types may be associated with other characteristics of the system, such as wireless resources. For example, priority users may be able to access different RF frequencies to transmit data and/or alerts, as compared to non-priority users.

To address problems related to operation in remote or otherwise challenging environments, the disclosed technology can use various communication technologies and/or architectures. For example, the disclosed technology can use any combination of single-in and single-out (SISO), single-in and multiple-out (SIMO), and/or multiple-in and multiple-out (MIMO) techniques to communicate between devices of the system. Additionally or alternatively, the disclosed technology can use wireless mesh network (WMN) and/or wireless mobile ad hoc network (MANET) technologies to communicate between devices of the system (e.g., in locations where cellular networks are unavailable). Other mesh networks, including RF networks, may be used as well. In these and other implementations, each device of the disclosed system can be a node and/or relay of the network. A decentralized architecture can be advantageous because no central hub is required to administer control of the network, and communications can persist using any number of nodes and/or with the addition or removal of any node of the network. In some implementations, the disclosed technology can include additional nodes of the network, such as a central node provided using a central device, tower, vehicle, drone, or the like.

Although examples are described herein related to off-road vehicles, the disclosed technology can be applied to various devices, users, and/or activities. For example, the system can be applied to logging trucks or equipment, farm equipment, private maintenance vehicles, snow plows, bicycles, aircraft, robotics devices, autonomous vehicles, drones/unmanned aerial vehicles (UAVs), watercraft, deployed members of the military, and so forth. Additionally, although examples are described herein related to avoiding collisions between vehicles, the disclosed technology can have other advantages, such as tracking usage (e.g., number of users and/or duration of use) of off-road areas or other areas used by vehicles or users, planning maintenance of such areas, locating users and/or devices, and so forth.

FIG. 1 is a block diagram illustrating a device 100 according to one or more embodiments. For example, the device 100 can be a main device and/or a secondary device worn or carried by a user of the proximity detection system. Additionally or alternatively, the device 100 can be a user device for implementing an application to operate the proximity detection system, such as a smartphone that uses an application of the system to configure other devices of the system (e.g., to configure wearable devices worn by a user). In some implementations, the proximity detection system comprises at least one device 100. For example, the proximity detection system can comprise a first device 100 associated with a first user and a second device 100 associated with a second user. Additionally or alternatively, the system can comprise a main device 100 coupled to a secondary device 100. Additionally or alternatively, the system can comprise a computing device 100 for configuring one or more user devices 100 using an application provided by the system.

The device 100 may include one or more processing elements 105, displays 110, memory 115, an input/output interface 120, power sources 125, and/or one or more sensors 130, each of which may be in communication either directly or indirectly. The device 100 may be considered a detection or alert device. The device can be assigned a group or "pod" of related devices and the system may include multiple groups (e.g., a first group and a second group) each of which may include separate, unrelated devices, but the devices are configured to detect and communicate with each other, often without cellular signal.

The processing element 105 can be any type of electronic device and/or processor capable of processing, receiving, and/or transmitting instructions. For example, the processing element 105 can be a microprocessor or microcontroller. Additionally, it should be noted that select components of proximity detection system may be controlled by a first processor and other components may be controlled by a second processor, where the first and second processors may or may not be in communication with each other. The device 100 may use one or more processing elements 105 and/or may utilize processing elements included in other components. For example, in implementations that include a main device and a secondary device, the secondary device can be configured to use a processing element 105 of the main device.

The display 110 provides visual output to a user and optionally may receive user input (e.g., through a touch screen interface). The display 110 may be substantially any type of electronic display, including a liquid crystal display, organic liquid crystal display, and so on. The type and arrangement of the display depends on the desired visual information to be transmitted (e.g., can be incorporated into a wearable item such as glasses, or may be a television or large display, or a screen on a mobile device). In some implementations, a user device of the system may not have a display 110. For example, a device worn or carried by a user of an off-road vehicle may not need a display 110 because alerts are communicated non-visually, such as by vibrations or sounds. Additionally, omitting a display 110 may be advantageous because a display 110 may distract a user when the user is operating the off-road vehicle. Therefore, the display 110 can be omitted in some implementations and/or in select devices of the proximity detection system.

The memory 115 stores data used by the device 100 to store instructions for the processing element 105, as well as store data for the proximity detection system. The memory 115 may be, for example, magneto-optical storage, read only memory, random access memory, erasable programmable memory, flash memory, or a combination of one or more types of memory components. The memory 115 can include, for example, one or more non-transitory computer-readable media carrying instructions configured to cause the processing element 105 and/or the device 100 or other components of the system to perform operations described herein.

The I/O interface 120 provides communication to and from the various devices within the device 100 and components of the computing resources to one another. The I/O interface 120 can include one or more input buttons, a communication interface, such as WiFi, Ethernet, or the like, as well as other communication components, such as universal serial bus (USB) cables, or the like. In some implementations, the I/O interface 120 can be configured to receive voice inputs and/or gesture inputs, such as to allow a user to disable or respond to an alert without having to press a button, touch a screen, or the like.

The power source 125 provides power to the various computing resources and/or devices. The proximity detection system may include one or more power sources, and the types of power source may vary depending on the component receiving power. The power source 125 may include one or more batteries, wall outlet, cable cords (e.g., USB cord), or the like.

The sensors 130 may include sensors incorporated into the proximity detection system. The sensors 130 are used to provide input to the computing resources that can be used to receive and/or analyze data related to presence and/or proximity of other devices. For example, the sensors 130 include sensors to detect that other devices are nearby and provide data about the other devices to the processing element 105, such as to determine or estimate a distance between the device 100 and another device. In some implementations, the sensors detect RF signals or other signals or data from another device, which indicates that another device is nearby. In some implementations, the sensors 130 can include at least one transceiver, transmitter, and/or receiver for transmitting and/or detecting signals (e.g., RF signals), such as for detecting an RF signal transmitted by a different device. In some implementations, the sensors 130 include one or more antennae for transmitting and/or receiving data between multiple devices 100. For example, the sensors 130 can include a single antenna in implementations using single-in and single-out (SISO) techniques or multiple antennae in implementations using multiple-in and multiple-out (MIMO) techniques. Additionally or alternatively, sensors 130 can be used to capture data of a first device 100 for transmission to a second device 100, such as geolocation data of the first device 100 captured using GPS technology. Other sensors 130 may capture various data, such as image data (e.g., using a camera), audio data, temperature data, biometric data, LIDAR, and so forth.

Figure 2:
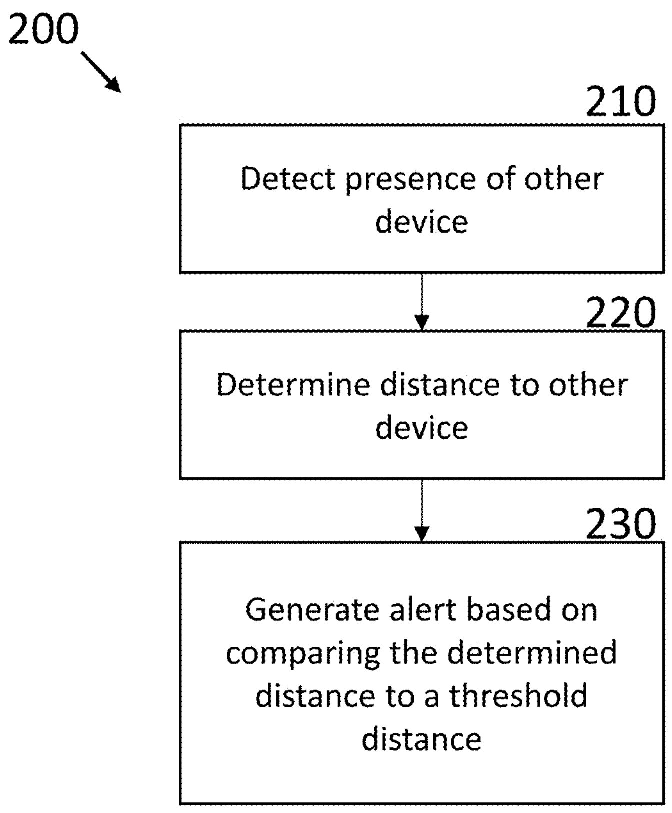
FIG. 2 is a flow diagram illustrating a method according to one or more embodiments.

FIG. 2 is a flow diagram illustrating a method 200 according to one or more embodiments. The method 200 can be performed using one or more devices 100 of the proximity detection system, such as a wearable device or a device carried by a user of an off-road vehicle.

The method 200 begins with operation 210, detecting presence of another device. For example, a sensor or transceiver of a device of the system can receive data, such as a signal (e.g., a RF signal) transmitted by a different device of the system (e.g., a device from a second group or pod of devices), which indicates that the different device is within a detectable range. In some implementations, the received signal can include an identifier that identifies the device that transmits the signal. In other embodiments, the second device may be within the same "group" or related to the first device, but be configured to generate an alert as a distance threshold (which may be lower as the devices are related) is crossed. It should be noted that in many embodiments, there is no intervening cellular tower, base station, WiFi router, access point, or the like, and so signals received at a device are received and transmitted directly between the two devices.

After operation 210, the method 200 proceeds to operation 220, determining a distance between the device and the different device. For example, the distance can be calculated or estimated based on a strength of the signal received at operation 210. Additionally or alternatively, the distance can be determined based on location data, such as geolocation data.

After operation 220, the method 200 proceeds to operation 230, generating an alert based on comparing the distance determined at operation 220 to a threshold distance. The threshold distance can indicate, for example, a maximum distance between the device and the different device for generating the alert. In some implementations, the threshold distance can be a default value (e.g., 10 yards, 100 yards, 500 yards, 1000 yards). In some implementations, the threshold distance can be set by a user (e.g., using an application provided by the system). In some, implementations, the threshold distance can be determined automatically, such as based on a speed, acceleration, or direction at which a user is traveling and/or based on a distance that it would take for a user to stop moving and/or otherwise avoid a collision or the like. In some implementations, multiple threshold distances can be used. For example, a first threshold distance can be used when detecting other devices that are within a pod and a second threshold distance (e.g., a greater threshold distance) can be used when detecting other devices that are not within the pod.

In some implementations, the method 200 includes determining whether the device detected at operation 210 is within a pod or group of related devices. For example, the system may suppress an alert when another device within the same pod is detected. In some implementations, the device that performs the method 200 can be associated with a pod, and the device can propagate the generated alert to other devices in the pod.

In some implementations, the method 200 includes determining or estimating a relative or absolute speed, acceleration, or direction of the device and/or the other device. In some implementations, the method 200 includes determining an alert level and/or alert type for the alert.

The method 200 can be performed in any order, including performing one or more operations in parallel and/or repeating or omitting one or more operations. Additionally, operations can be added to the method 200 without deviating from the teachings of the present disclosure. In some implementations, operations of the method 200 can be repeated at different intervals. For example, the device can scan to detect presence of other devices at a predetermined interval (e.g., every second, every five seconds, every ten seconds), and the interval of scanning can automatically increase when a device is detected (e.g., every tenth of a second, every half second, every second), such that detection is performed and/or distance or other characteristics are determined more frequently when other devices are detected nearby.

Figure 3A:
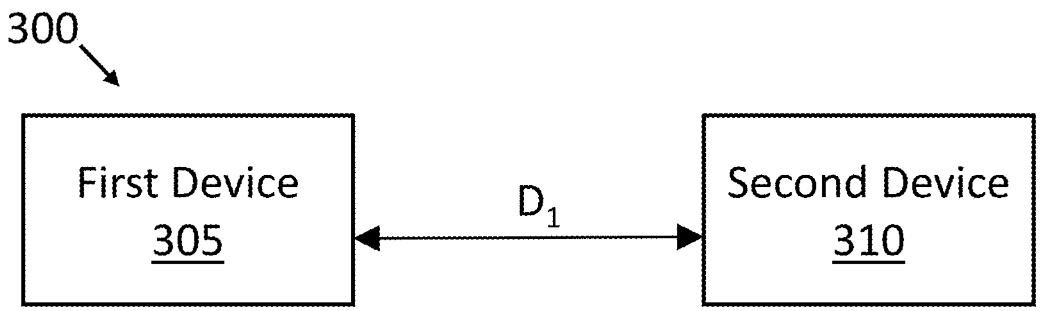
FIG. 3A is a block diagram illustrating an environment in which a proximity detection system operates according to one or more embodiments.

FIG. 3A is a block diagram illustrating an environment 300 in which a proximity detection system operates according to one or more embodiments. The system in the environment 300 includes at least a first device 305 and a second device 310. The first device 305 and the second device 310 can each be a device 100, as described with reference to FIG. 1. The first device 305 and the second device 310 are each associated with respective users or groups of users, such as users of off-road vehicles, families, groups of friends, or the like. For example, the respective users may wear or carry a device associated with a first group, e.g., first device 305 and the second users may wear devices associated with the second group of devices, e.g., second device 310, each of which may detect presence or proximity of other such devices, which indicates presence or proximity of other users. In some embodiments, related devices may also detect the presence of related devices, but in these instances the alert threshold may be set to a lower distance as often related parties will be aware of each other and only very close encounters may need to be alerted.

In the environment 300 of FIG. 3A, the first device 305 and the second device 310 are separated by a first distance $D_1$. As described herein, each of the first device 305 and the second device 310 may monitor to detect presence and/or proximity of another device. For example, the first device 305 and the second device 310 may each transmit a signal, such as a RF signal, that can be detected by a sensor of any other device of the system. For example, the second device 310 transmits a signal and the first device 305 detects the transmitted signal and/or vice versa. Upon detecting the signal transmitted by the second device 310, the first device 305 can evaluate a strength of the transmitted signal and determine or estimate the distance $D_1$ based on the strength of the transmitted signal. The first device 305 can compare the distance $D_1$ to a threshold distance, such as a threshold distance stored in a memory of the first device 305 or a threshold distance that is automatically determined by the first device 305, and the first device 305 can generate an alert if the distance $D_1$ is equal to or less than the threshold distance. In the depicted example of FIG. 3A, the first device 305 may determine that the distance $D_1$ is greater than the threshold distance. Accordingly, the first device 305 does not generate an alert. Additionally or alternatively, the first device 305 may generate only a low-level alert to indicate that the second device 310 is detected, but the first device 305 may not generate a high-level alert to indicate an increased risk of a collision. Additionally or alternatively, if the distance $D_1$ exceeds a range of the first device 305, such as a range within which the transmitted signal can be detected, then the first device 305 does not detect the second device 310, and no alerts are generated.

As described herein, the alert generated by the first device 305 can be used to inform a user of a condition, such as presence and/or proximity of the second device 310 or an increased risk of a collision. The first device 305 or a secondary device (not shown) coupled to the first device 305 can perform one or more operations responsive to the alert, such as vibrating, flashing, generating an audio alert, and/or the like.

Figure 3B:
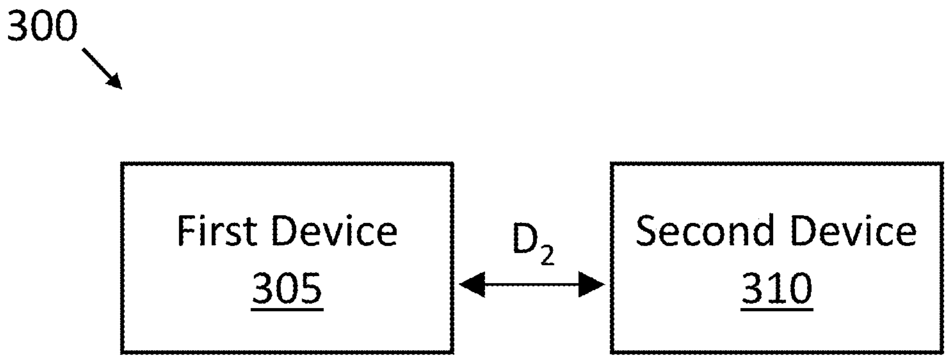
FIG. 3B is a block diagram illustrating an environment in which a proximity detection system operates according to one or more embodiments.

FIG. 3B is a block diagram illustrating the environment 300 in which the proximity detection system operates according to one or more embodiments. In the example of FIG. 3B, the first device 305 and the second device 310 are separated by a distance $D_2$, which is less than the distance $D_1$ of FIG. 3A, for example, because one or both of the first device 305 or the second device 310 has moved relative to the other device (e.g., because a user of an off-road vehicle has driven the vehicle in the direction of another user). Accordingly, the signal transmitted by the second device 310 may be detected at the first device 305 more strongly at the distance $D_2$ than at the distance $D_1$. The first device 305 may determine or estimate the distance $D_2$ and compare the distance $D_2$ to the threshold distance, and the first device 305 generates an alert if the distance $D_2$ is less than the threshold distance.

Although only a first device 305 and a second device 310 are illustrated in the examples of FIGS. 3A and 3B, any number of devices can be used. Additionally, any device of the system can perform any of the operations described with reference to the first device 305 and the second device 310. For example, the second device 310 can detect presence and/or proximity of the first device 305 and generate alerts, as described herein. In some implementations, the first device 305 and/or the second device 310 can perform other operations. For example, a speed, acceleration, and/or direction of a device can be estimated or determined based on the distances $D_1$ and $D_2$, such as to determine whether the second device 310 is moving toward or away from the first device 305 and/or to determine a speed and/or acceleration of the second device 310 relative to the first device 305. In these and other implementations, multiple distances $D_1$ to $D_n$ can be determined at different times $T_1$ to $T_n$, and the distances and corresponding times can be used to estimate speed, acceleration, and/or direction. In these and other implementations, alerts can be generated based on any combination of distance, speed, acceleration, direction, or other variables. Additionally or alternatively, the first device 305 and/or the second device 310 may determine a level and/or type of alert to generate, such as a low-level alert to indicate presence of another device within a distance that exceeds the threshold distance and/or one or more high-level alerts to indicate proximity of another device within a distance equal to or less than the threshold distance, thus indicating an increased likelihood of a collision.

In various examples, the system and methods disclosed herein help reduce the likelihood of collisions, such as collisions between users of off-road vehicles. Moreover, the disclosed technology addresses various technical problems of existing technologies for tracking the location and/or proximity of devices (e.g., devices associated with users of off-road vehicles). For example, the disclosed technology includes dedicated devices that can be worn and/or carried by users of off-road vehicles to generate alerts when they are within a threshold distance of other users of off-road vehicles, which allows the users to avoid collisions. Additionally, the disclosed technology can be used in remote or otherwise challenging environments, such as environments where common wireless or other communication technologies may be unavailable and/or environments where visibility is low due to geography, vegetation, and so forth.

In various examples where components, systems and/or methods are implemented using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like. Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform functions of the systems and/or methods described herein. For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

In view of this disclosure it is noted that the various methods and devices described herein can be implemented in hardware, software, and/or firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the invention. The functionality of one or more of the processors described herein may be incorporated into a fewer number or a single processing unit (e.g., a CPU) and may be implemented using application specific integrated circuits (ASICs) or general purpose processing circuits which are programmed responsive to executable instructions to perform the functions described herein.

Of course, it is to be appreciated that any one of the examples, examples or processes described herein may be combined with one or more other examples, examples and/or processes or be separated and/or performed amongst separate devices or device portions in accordance with the present systems, devices and methods.

Finally, the above-discussion is intended to be merely illustrative of the present systems and methods and should not be construed as limiting the appended claims to any particular example or group of examples. Thus, while the present system has been described in particular detail with reference to illustrative examples, it should also be appreciated that numerous modifications and alternative examples may be devised by those having ordinary skill in the art without departing from the broader and intended spirit and scope of the present systems and methods as set forth in the claims that follow. Accordingly, the specification and drawings are to be regarded in an illustrative manner and are not intended to limit the scope of the appended claims.

What is claimed is:

1. A processor-implemented method of generating a proximity-based alert in a remote environment, the method comprising:

detecting, at a first device, presence of a second device based on a signal received from the second device, wherein the signal is received directly from the second device;

determining, at the first device, a distance between the first device and the second device based at least in part on a strength of the received signal;

determining at least one of a speed, an acceleration, or a direction of the first device or the second device;

determining a relationship between the first device and the second device, the relationship indicating whether the devices are within a same group of devices or are in different groups of devices;

determining at least one of an alert level or an alert type based on the relationship and further based on at least one of the speed, the acceleration, or the direction; and generating an alert based on comparing the determined distance to a threshold distance that is selected or adjusted based on the relationship and further based on at least one of the speed, the acceleration, or the direction.

2. The method of claim 1, wherein the first device is part of a first group of devices and wherein the second device is part of a second group of devices, separate from the first group.

3. The method of claim 1, wherein generating the alert includes causing at least one of a tactile alert, an audio alert, or a visual alert.

4. The method of claim 3, wherein the at least one of the tactile alert, the audio alert, or the visual alert is performed at a secondary device coupled to the first device.

5. The method of claim 1, further comprising:

determining a user class or type associated with the second device, wherein generating the alert is further based on the user class or type.

6. The method of claim 1, wherein the first device comprises a wearable device.

7. The method of claim 2, wherein the first device is associated with a first user and the second device is associated with a second user, and wherein the first group of devices is associated with a first group of users and the second group of devices is associated with a second group of users.

8. The method of claim 7, wherein the first user is an operator of a first off-road vehicle and the second user is an operator of a second off-road vehicle.

9. The method of claim 2, further comprising:

configuring the first device as a lead device of the first group of devices; and providing, by the first device, the alert to other devices in the first group of devices.

10. The method of claim 9, wherein the first device is configured as the lead device using a quick response (QR) code associated with the first device.

11. The method of claim 1, wherein the first device and the second device do not communicate via a cellular network.

12. A notification device comprising:

a transceiver;

a processor; and a memory carrying instructions that, when executed, cause the notification device to:

detect presence of an unrelated device based on a signal received from the unrelated device via the transceiver, wherein the notification device is part of a first group of devices that is separate and unrelated to a second group of devices and the unrelated device is part of the second group of devices;

estimate, by the processor, a distance between the notification device and the unrelated device based at least in part on a strength of the signal;

determine at least one of a speed, an acceleration, or a direction of the notification device or the unrelated device;

determine at least one of an alert level or an alert type based on whether the first and second groups are related or unrelated and further based on at least one of the speed, the acceleration, or the direction; and generate an alert based on comparing the estimated distance to a threshold distance that is selected or adjusted based on the group relationship and further based on at least one of the speed, the acceleration, or the direction.

13. The notification device of claim 12, wherein estimating the distance is further based on geolocation data of the notification device, geolocation data of the unrelated device, or both.

14. The notification device of claim 12, further comprising at least one of:

a display configured to provide a visual component of the alert via a graphical user interface;

a speaker configured to provide an auditory component of the alert; or an electric motor configured to provide a tactile component of the alert.

15. The notification device of claim 12, wherein the instructions further cause the notification device to:

establish a connection with the unrelated device via a wireless mesh network (WMN) or a wireless mobile ad hoc network (MANET) to receive the signal.

16. The notification device of claim 12, wherein the instructions further cause the notification device to:

determine a user class or type associated with the unrelated device, wherein generating the alert is further based on the user class or type.

17. The notification device of claim 12, further comprising:

at least one sensor configured to capture sensor data associated with the notification device, wherein the instructions further cause the notification device to transmit the captured sensor data to the unrelated device via the transceiver.

18. A method for detecting devices in a remote environment without cellular coverage comprising:

receiving a first signal from a first device via a non-cellular network and through a direct transmission;

determining a first distance of the first device based on the first signal;

determining at least one of a speed, an acceleration, or a direction of at least one of the first device or a second device;

determining a relationship between the first device and the second device; and generating an alert at the second device when the first distance is under a threshold satisfies a threshold selected or adjusted based on the relationship and further based on at least one of the speed, the acceleration, or the direction.

19. The method of claim 1, wherein a first threshold distance is used when the devices are within the same group, and a second threshold distance is used when the devices are not within the same group.

* * * * *